(12) United States Patent
Zhang et al.

(10) Patent No.: US 9,075,293 B2
(45) Date of Patent: Jul. 7, 2015

(54) ILLUMINATION DEVICE, PROJECTING DEVICE AND LIGHTING DEVICE

(71) Applicant: Appotronics Corporation Limited, Shenzhen (CN)

(72) Inventors: Lili Zhang, Shenzhen (CN); Yanzheng Xu, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 185 days.

(21) Appl. No.: 13/693,803

(22) Filed: Dec. 4, 2012

(65) Prior Publication Data

US 2013/0194551 A1  Aug. 1, 2013

(51) Int. Cl.
| | |
|---|---|
| *G03B 21/00* | (2006.01) |
| *G03B 21/14* | (2006.01) |
| *G03B 21/20* | (2006.01) |
| *F21V 9/00* | (2015.01) |
| *F21V 9/10* | (2006.01) |
| *F21Y 101/02* | (2006.01) |

(52) U.S. Cl.
CPC .............. *G03B 21/14* (2013.01); *G03B 21/208* (2013.01); *F21V 9/00* (2013.01); *G03B 21/204* (2013.01); *F21V 9/10* (2013.01); *F21Y 2101/02* (2013.01); *F21Y 2101/025* (2013.01)

(58) Field of Classification Search
CPC ..... H04N 9/208; H04N 9/315; H04N 9/3129; G03B 21/14; G03B 21/204; G03B 21/208
USPC .................. 353/30, 31, 84, 85, 94; 359/359, 359/491.01; 348/342, 743, 744; 362/84, 362/260, 296.01
See application file for complete search history.

(56) References Cited

U.S. PATENT DOCUMENTS

| 6,653,765 | B1 | 11/2003 | Levinson et al. | |
|---|---|---|---|---|
| 6,791,259 | B1 | 9/2004 | Stokes et al. | |
| 8,562,146 | B2 * | 10/2013 | Kitano et al. | 353/84 |
| 2009/0065791 | A1 | 3/2009 | Yen et al. | |
| 2011/0199580 | A1 * | 8/2011 | Hirata et al. | 353/31 |
| 2011/0228232 | A1 * | 9/2011 | Sakata et al. | 353/31 |
| 2012/0026721 | A1 * | 2/2012 | Kurt et al. | 362/84 |
| 2012/0062857 | A1 * | 3/2012 | Saitou et al. | 353/98 |
| 2012/0206900 | A1 * | 8/2012 | Yang et al. | 362/84 |
| 2012/0320344 | A1 * | 12/2012 | Okumura | 353/98 |

FOREIGN PATENT DOCUMENTS

| CN | 101471533 | 7/2009 |
|---|---|---|
| CN | 102237474 | 11/2011 |
| KR | 2009-0054841 | 6/2009 |

* cited by examiner

*Primary Examiner* — Sultan Chowdhury
(74) *Attorney, Agent, or Firm* — Chen Yoshimura LLP

(57) ABSTRACT

An illumination device includes a wavelength conversion material layer with a first surface, which includes a wavelength conversion material and a scattering material; a light guide device located adjacent the wavelength conversion material layer on a side facing its first surface for directing an excitation light onto the first surface of the wavelength conversion material layer, and for directing a mixed light emitted from the first surface, which includes converted light and remaining excitation light not absorbed by the wavelength conversion material layer, into a light exit port. In this illumination device, the light guide device can collect the excitation light reflected by the wavelength conversion material layer effectively, which insures that adding scattering materials into the wavelength conversion material layer doesn't have a significant impact on the luminous efficiency of the illumination device, and resolves the conflict between color uniformity and luminous efficiency of the device.

30 Claims, 5 Drawing Sheets

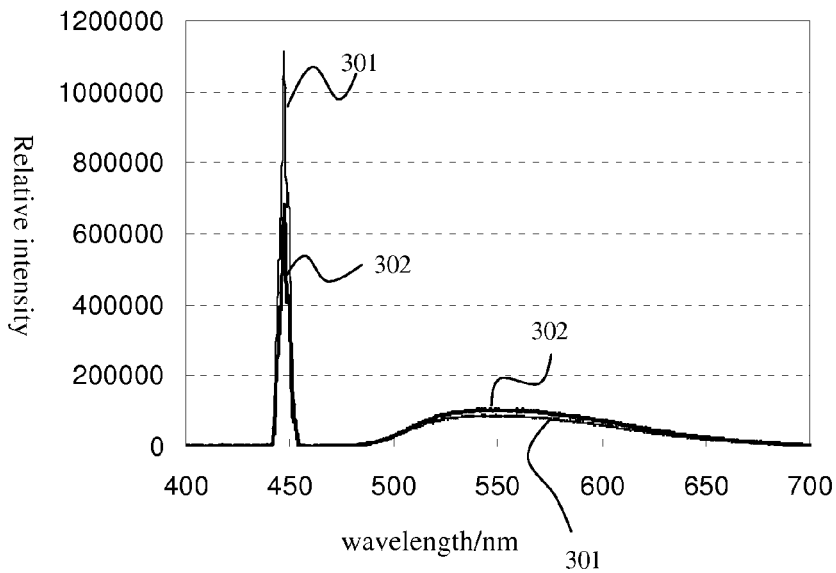
Fig. 3
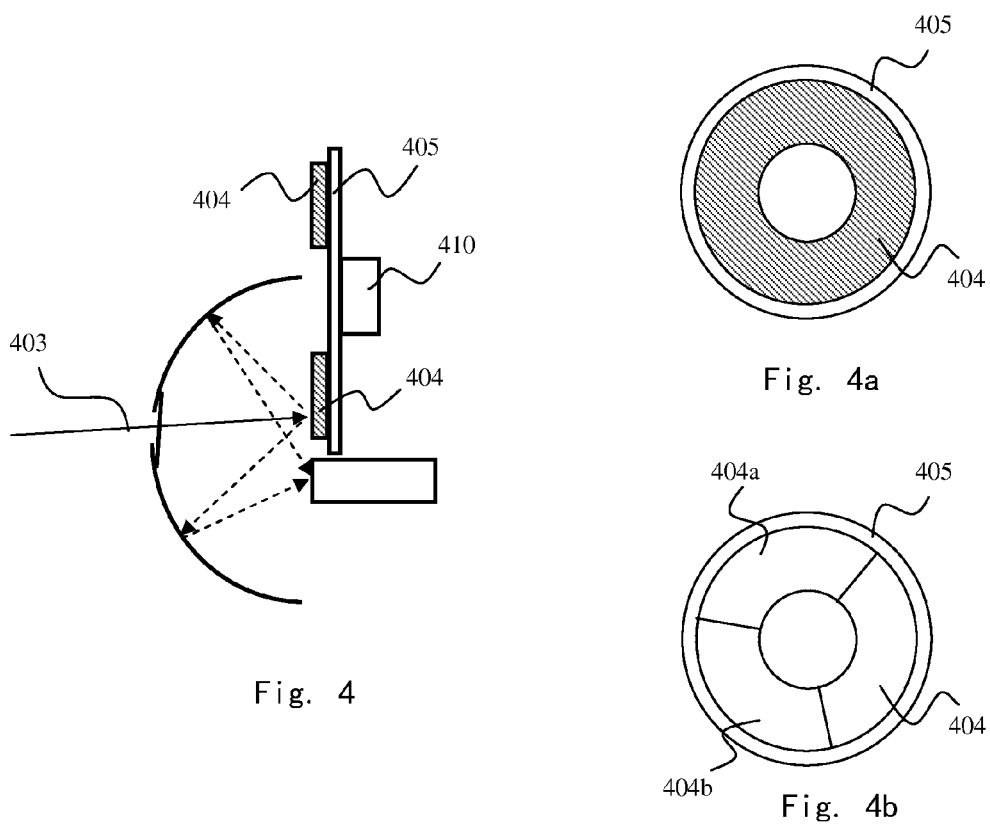
Fig. 4
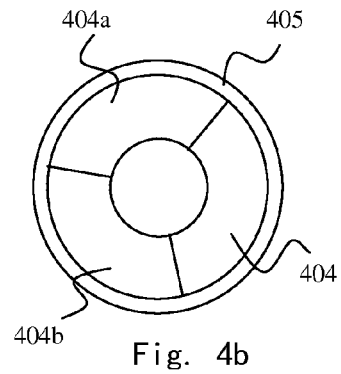
Fig. 4a
Fig. 4b

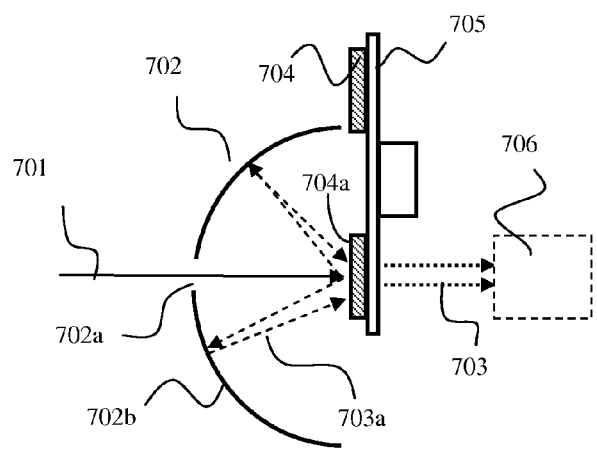
Fig. 7
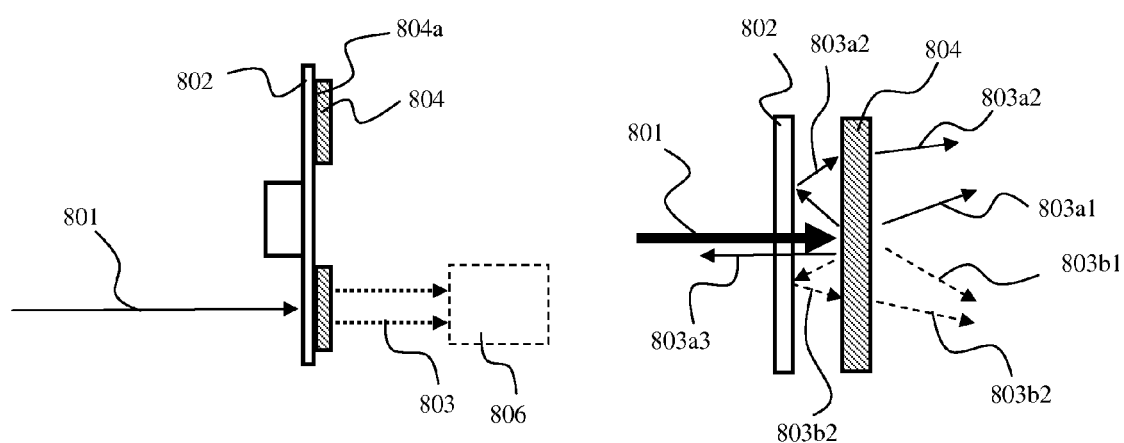
Fig. 8
Fig. 8a

ILLUMINATION DEVICE, PROJECTING DEVICE AND LIGHTING DEVICE

BACKGROUND OF THE INVENTION

1. Field of the Invention

This invention relates to technical field of optical technology, and in particular, it relates to illumination devices, projecting devices and lighting devices.

2. Description of the Related Art

Currently, solid state light sources are widely used in general lighting, special lighting, projection and display due to their characteristics, such as long lifetime and environment friendly nature. Among these solid state light sources, the ones emitting white light show a great potential for development in the field of lighting.

There are mainly two approaches to achieve solid state white light sources. One is that a plurality of different monochromatic light sources are packaged together to generate a mixed white light. For example, red (R), green (G), blue (B) LEDs (light emitting diodes) are turned on at the same time to obtain a white light. The other one is that yellow phosphor materials are stimulated by blue light to generate yellow light, wherein the yellow converted light from the yellow phosphors and the remaining blue light which hasn't been absorbed by the yellow phosphors are mixed to obtain white light. The second approach is widely used due to its higher efficiency.

To reduce the influence of heat emitted from LED on phosphor materials, the remote phosphor technology gets applied in more and more applications, one of which is shown in FIG. 1a and FIG. 1b. In FIG. 1a, an excitation light 101 is incident on a phosphor layer 104 deposited on a minor 105, and excites the phosphor layer 104 to generate a converted light 103. Filter 102 will transmit the excitation light 101 and reflect the converted light 103. The converted light 103 becomes output light after being reflected by the filter 102.

The disadvantage of the device illustrated in FIG. 1a is that the output light contains the converted light only without the excitation light. This is because the filter 102 splits the converted light from the excitation light based on the non-overlapping nature of the spectra of the two lights. Thus, the remaining excitation light that hasn't been absorbed and is emitted together with the converted light from the phosphor layer 104, will be split away from the excitation light by the filter 102 and leave the converted light alone for output.

In FIG. 1b, the excitation light 111 is incident on a phosphor layer 114 after being transmitted by a filter 115. The filter 115 transmits an excitation light and reflects a converted light. Being excited by the excitation light, the phosphor layer 114 emits a converted light which is spilt into two parts, wherein the first part is output directly, and the second part is incident on the filter 115 then reflected by it to be output. These two parts of light and the remaining excitation light that hasn't been absorbed by the phosphor material form an output light 113.

The device illustrated in FIG. 1b can obtain a mixed light composed of the excitation light and the converted light, but the mixed light often has problems in color uniformity. Of the two components of the mixed light, the luminance distribution of the converted light is generally a Lambertian distribution, i.e. isotropic distribution, and the luminance distribution of the excitation light, which is influenced by multiple factors, such as the thickness of the phosphor layer and the luminance distribution of the excitation light 111 before impinging on the phosphor layer, is not a perfect isotropic distribution generally. These lead to a variation of proportion of the excitation light and the converted light in all propagation directions of the output light 113, and further lead to a variation of the color of the white mixed light, significantly impacting the color uniformity of the lighting source.

In fact, the phosphor material has a certain scattering effect on the excitation light. Therefore, one solution to the problem described above is to increase the amount of the phosphor material, so that all the excitation light is scattered by the phosphor material and form an output light of isotropic distribution. But one problem of this solution is that the amount of the remaining excitation light is too small, which results in a low color temperature of the final output white light. In other words, the requirement for a certain color temperature of the final output white light has confined the proportion of the excitation light and the converted light in the output light, so the usage of the phosphor materials has been limited.

In order to increase the scattering effect on the excitation light without increasing the amount of the phosphor materials, scattering materials are employed in multiple applications. For example, Chinese patent applications 201010166062.1, 200710304216.7, US patent US20090065791, U.S. Pat. Nos. 6,791,259, 6,653,765 and Korea patent KR2009054841 describe methods where scattering materials are added into a phosphor material layer to improve the color uniformity of the output light.

However, a problem of adding scattering materials is that, as the scattering effect on the excitation light is increased, a certain portion of the excitation light will be reflected directly by the phosphor material layer and transmitted through the filter 115 as energy loss. What is obvious is that, a better color uniformity of the required output light needs a larger amount of scattering materials added, which causes a greater loss of the excitation light and further a lower efficiency of the lighting device.

In short, the color uniformity of the mixed light composed of excitation light and converted light contradicts the luminous efficiency of the lighting device using the present technology.

SUMMARY OF THE INVENTION

To solve the various problems of prior arts, the present invention is directed to an illumination device based on wavelength conversion material, which generates a uniformly mixed light composed of excitation light and converted light with high efficiency.

To achieve these and other advantages and in accordance with the purpose of the present invention, as embodied and broadly described, the present invention provides an illumination device, which includes: an excitation light source for generating an excitation light; a wavelength conversion material layer with a first surface, the wavelength conversion material layer containing a wavelength conversion material and a scattering material, the wavelength conversion material absorbing a portion of the excitation light and emitting a converted light with wavelength spectrum different from that of the excitation light, the wavelength conversion material layer emitting from its first surface a mixed light which includes the converted light and unabsorbed excitation light; a light exit port; and a light guide device located adjacent to the wavelength conversion material layer on a side facing its first surface for directing the excitation light onto the first surface of the wavelength conversion material layer and directing the mixed light emitted from the first surface of the wavelength conversion material layer into the light exit port.

The present invention also provides a projecting device, which includes the illumination device described above as a light source.

The present invention also provides a lighting device, which includes the illumination device described above as a light source.

In the illumination device of the present invention, a light guide device located adjacent the wavelength conversion material layer on a side facing its first surface can collect the excitation light reflected by the wavelength conversion material layer effectively, which insures that adding scattering materials into the wavelength conversion material layer doesn't have an adverse impact on the efficiency of illumination device, and resolves the conflict between color uniformity and luminous efficiency of the illumination device.

BRIEF DESCRIPTION OF THE DRAWINGS

FIG. 3 illustrates a wavelength spectrum of a white light obtained from the first embodiment.

FIG. 4 illustrates an illumination device according to a second embodiment of the present invention.

FIGS. 4a and 4b illustrate respectively the plan view of the wavelength conversion material layer and of the reflection substrate according to the second embodiment of the present invention.

FIG. 7 illustrates an illumination device according to a sixth embodiment of the present invention.

FIG. 8 illustrates an illumination device according to a seventh embodiment of the present invention.

FIG. 8a illustrates light traveling paths in a portion of the illumination device of FIG. 8.

Preferred embodiments of the present invention are described below with reference to the drawings.

DETAILED DESCRIPTION OF THE PREFERRED EMBODIMENTS

As is described in the prior art, in a conventional lighting device that emits a mixed light composed of excitation light and converted light, there is a conflict between the uniformity of the output light and the efficiency of the lighting device. The essential reason of this problem is that the reflected excitation light caused by scattering material can't be utilized. The present invention provides a new structure of illumination device, wherein a light guide device is set adjacent to the wavelength conversion material layer on a side facing to the excitation light. The light guide device directs the unabsorbed excitation light reflected by the wavelength conversion material layer into the light exit port of the illumination device while directing the excitation light onto the wavelength conversion material layer, which realizes the reuse of the excitation light wasted in the prior art and resolves the conflict between the uniformity of output light and the luminous efficiency of lighting device fundamentally.

The illumination device can generate a uniformly mixed light composed of excitation light and converted light with high efficiency. There are multiple compositions for the mixed light. For example, wavelength conversion materials that generate yellow light are used to convert blue excitation light into yellow light, which is mixed with the unabsorbed blue excitation light to generate white light, or wavelength conversion materials that generate red light are used to convert a green excitation light into red light, which is mixed with the unabsorbed green excitation light to generate yellow light. The examples described in the invention are used only for illustration and don't limit other compositions of mixed light.

Figure 2:
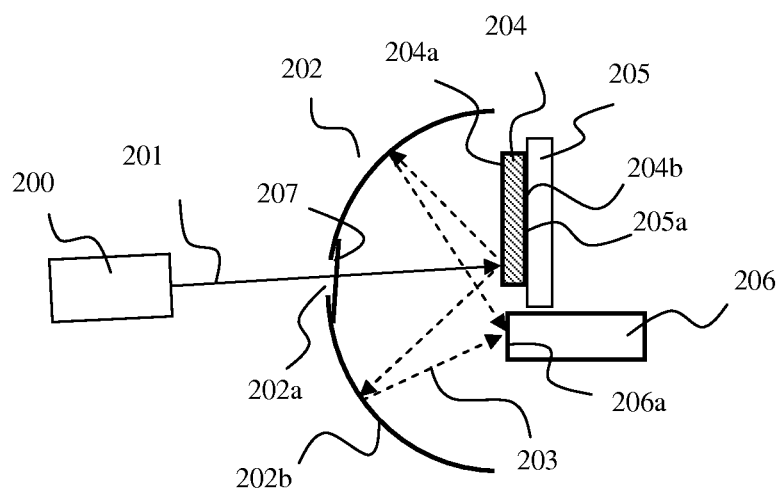
FIG. 2 illustrates an illumination device according to a first embodiment of the present invention.

The illumination device according to the first embodiment of the present invention, as shown in FIG. 2, includes an excitation light source 200 for generating an excitation light 201, and a wavelength conversion material layer 204 for absorbing a portion of the excitation light and emitting light having wavelength spectrum different from that of the excitation light. The wavelength conversion material layer 204 includes a first surface 204a which the excitation light 201 impinges on and a second surface 204b.

There are many choices for the excitation light source 200, such as LD (laser diode), LED (light emitting diode), or a mixture of the both, or other suitable light sources that can be used to excite wavelength conversion materials. The spectrum of the excitation light should include at least a part of spectrum of visible light if the illumination device of this embodiment is used for display or illumination or other applications for human eyes. Of the excitation light sources, blue LDs or blue LEDs are preferred. The light sources described in this invention are just examples but not limitations to the types or colors of excitation light sources.

The illumination device of this embodiment also includes a light exit port, and a light collection device 206 located at the light exit port, which includes an entrance aperture 206a. The illumination device further includes a light guide device 202 located adjacent to the wavelength conversion material layer 204 on a side facing its first surface 204a, which is utilized to direct the excitation light 201 onto the first surface 204a of the wavelength conversion material layer 204, and to direct the mixed light composed of the converted light and the remaining excitation light that hasn't been absorbed by the wavelength conversion material layer 204, which is emitted from the first surface 204a of the wavelength conversion material layer 204, to the aperture 206a of the light collection device 206.

The light guide device 202 according to this embodiment includes a reflection device having a clear aperture 202a and a reflection surface 202b placed around the clear aperture. The excitation light 201 is directed by the reflection device by passing through the clear aperture 202a and impinges on the first surface 204a of the wavelength conversion material layer 204, while the mixed light that is emitted from the first surface 204a of the wavelength conversion material layer 204 and is composed of the converted light and the remaining excitation light that hasn't been absorbed by the wavelength conversion material layer 204, is directed to the entrance aperture 206a of the light collection device 206 by being reflected by the reflection surface 202b.

The illumination device of this embodiment also includes a reflective substrate 205 having a reflective surface 205a for reflecting the excitation light and the converted light. The second surface 204b of the wavelength conversion material layer 204 is located on the reflection surface 205a of the reflection substrate 205. There are multiple ways to obtain the reflective substrate, such as by coating a layer of metallic reflective film or dielectric reflective film on the surface of a glass or a smooth metallic substrate by sputtering, or adhering a reflective film to the surface of substrates of any materials.

It is worth noting that the reflection surface 205a in the reflection substrate 205 may alternatively be formed on the other side of the substrate 205 (opposite the side where the wavelength conversion material layer 204 is deposited) if the substrate 205 is formed of optical transparent materials like glass, wherein the excitation light and the converted light that are incident on the reflection substrate will have been transmitted through the optical transparent substrate and then reflected by the reflective surface. In this situation, the light spot on the wavelength conversion material will be diffused because the light rays propagate transversely inside the reflection substrate, which will cause an energy loss when the light rays enter the entrance aperture 206a of the light collection device 206. This energy loss can be avoided by expanding the area of the entrance aperture 206a of the light collection device 206.

In the actual working process of the illumination device according to this embodiment, a portion of the excitation light 201 is absorbed by the wavelength conversion material layer 204 and converted to converted light. A first portion of the converted light exits the wavelength conversion material directly, and a second portion is incident on the reflective surface 205a of the reflective substrate 205 and gets reflected, then exits the wavelength conversion material. The first portion and the second portion constitute the converted light emitted from the first surface 204a of the wavelength conversion material layer. Another portion of the excitation light will not be absorbed by the wavelength conversion material layer 204; instead, it will be reflected by the wavelength conversion material layer 204 directly. So the emission light 203 from the wavelength conversion material layer 204 includes two components, the excitation light and the converted light emitted from the first surface 204a of the wavelength conversion material layer 204.

The emission light 203 (referred to as the mixed light 203) from the wavelength conversion material layer 204 can be separated into two parts in space. The first part is incident on the reflection surface 202b of the arc-shaped reflection device 202, and is reflected to the entrance aperture 206a of the light collection device 206 to enter the light exit port. The second part passes through the clear aperture 202a and is lost. As the second part of the emission light 203 only constitutes a small proportion in the whole emission light energy, the loss caused by the second part of the emission light 203 can be often neglected. Preferably, a filtering optics 207 can be disposed at the clear aperture 202a of the arc-shaped reflection device, so as to increase the utilization of the second part of the emission light 203. The filtering optics 207 transmits excitation light 201 and reflects converted light. So the converted light component in the second part of emission light 203 is reflected by the filtering optics 207 into the entrance aperture 206a of the light collection device 206 to enter the light exit port. But the excitation light component in the second part of emission light 203 still exits and becomes a loss.

To summarize, the emission light entering the light exit port is a mixed light composed of two components, which are excitation light and converted light. However, the luminous distributions of these two lights are different from each other. As mentioned earlier, the luminous distribution of the converted light is isotropic, which is a Lambertian distribution; though being scattered partially by the wavelength conversion materials, the excitation light still has a luminous distribution different from that of the converted light. This is because a portion of excitation light passes through the wavelength conversion layer 204 without interacting with the wavelength conversion materials, impinges on the reflection substrate 205 directly, and then passes through the wavelength conversion layer again after being reflected by the reflection substrate 205 without interacting with the wavelength conversion materials, to become a portion of the emission light 203. This portion of the emission light, which has not been scattered by the wavelength conversion materials, has the same luminous distribution as the incident excitation light 201. Therefore, the luminous distributions of the excitation light component and the converted light component in the emission light 203 are different, which will reduce the color uniformity of the emission light 203. For example, in the illumination device wherein blue LEDs are utilized as excitation light source to excite yellow wavelength conversion materials, the final emission light 203 has more blue lights along the optical axis, and has more yellow lights in the propagation directions that have large angle from the optical axis, as the laser light has a strong directionality.

The amount of excitation light passing through the wavelength conversion materials without interaction can be reduced by increasing the amount of wavelength conversion materials in the wavelength conversion material layer 204. But with it the proportion of the converted light component in the emission light 203 increases inevitably, which has an impact on the color of the emission light 203.

Mixing scattering material into the wavelength conversion material layer 204 can change the luminous distribution of the excitation light component in the emission light 203 into near-isotropic without changing the color of the emission light 203, and improve the color uniformity of the emission light 203 greatly. Generally, the scattering material are white or optical transparent inorganic powders, such as but not limited to white carbon black, titanium dioxide, alumina, diatomite or barium sulfate. Though optical transparent inorganic powders don't scatter the lights inside the powder particles, lights are partially reflected and partially refracted when incident on the surfaces of the optical transparent inorganic particles due to the difference of refractive index between the both sides of the surfaces, which can been regarded as a scattering effect of light.

Experiments show that the uniformity of the emission light 203 can be improved when the mass ratio of scattering materials to wavelength conversion materials is larger than 0.1 in the wavelength conversion material layer 204, and that the uniformity of the emission light 203 can meet the requirement for practical applications when the mass ratio of scattering materials to wavelength conversion materials is larger than 1. The required mass ratio of scattering materials to wavelength conversion materials depends on the proportion between the excitation light component and the converted light component in the emission light 203: the mass ratio of scattering materials to wavelength conversion materials needs to be higher when the required proportion of the excitation light is higher.

For example, in the situation where blue laser lights are used to excite a yellow wavelength conversion material layer to produce white lights, the mass ratio of scattering materials to wavelength conversion materials in the wavelength conversion material layer 204 should be about 2 when the required color temperature of the emitted white lights ranges from 5000K to 6000K (the spectrum of such a white light is shown as spectrum 302 in FIG. 3). The mass ratio of scattering materials to wavelength conversion materials in the wavelength conversion material layer 204 should be about 10 when the required color temperature of the emitted white lights ranges from 9000K to 10000K (the spectrum of such a white light is shown as spectrum 301 in FIG. 3). Therefore, the color of the emission mixed light can be adjusted by adjusting the mass ratio of scattering materials to wavelength conversion materials.

There are multiple approaches for mixing the scattering materials and wavelength conversion materials in the wavelength conversion material layer 204. For example, the simplest approach is homogeneously mixing. In a first preferred implementation, one wavelength conversion material sub-layer formed by wavelength conversion materials and one scattering material sub-layers formed by scattering materials are place over each other with the scattering material sub-layer closer to the first surface 204a of the wavelength conversion material layer 204. Thus, the excitation light 201 is incident on the scattering material sub-layer first. A portion of the excitation light is directed into the light exit port by the arc-shaped reflection device after being reflected, and the rest of the excitation light is incident on the wavelength conversion material sub-layer and is absorbed to produce converted light. Comparing to homogeneously mixing of wavelength conversion materials and scattering materials, the excitation light incident on the wavelength conversion materials in the first preferred implementation has a lower excitation power due to the scattering of the scattering material sub-layer, which is good for the light conversion efficiency of wavelength conversion materials.

In a second preferred implementation, the scattering material sub-layer is closer to the reflection substrate 205 than the wavelength conversion material sub-layer, and the scattering material sub-layer is deposited on the reflection substrate 205, becoming part of it. This reflective substrate achieves the functionality of light-reflection as well as light-scattering due to the reflection nature and scatter nature of the scattering material sub-layer on its surface.

There are multiple approaches to obtain the wavelength conversion material layer 204 which comprises the wavelength conversion material and the scattering material. For example, the wavelength conversion material and scattering material can be adhered together to form a layer by using adhesive materials. Adhesive materials may be organic, such as silica gel or epoxy resin, or inorganic, such as sodium silicate. In fact, the wavelength conversion material may also be adhered together by using the scattering material itself instead of an additional adhesive material. For example, if the scattering material is a nano-silica particle material, the two materials can be adhered together by using Van der Waals force and intermolecular forces between the nano-silica particles and the wavelength conversion material particles. The materials described above are only examples and don't limit the utilization of other materials.

The particle size of the scattering material is not limited in the present invention. But, for optimization of light-scattering effect, the average particle size of the scattering material ranges preferably from 0.1 um to 50 um, wherein the range from 1 um to 20 um is preferred.

In the illumination device according to this embodiment, the reflection device 202 is an arc-shaped reflection device. For optimization, the arc-shaped reflection device may be a hemisphere or part of a hemisphere, and the light spot on the wavelength conversion material layer 204 formed by the excitation light 201 is located at a first point close to the center of the hemisphere, and the entrance aperture 206a of the light collection device 206 is located at a second point close to the center of the hemisphere, the first point and the second point being symmetric about the center. These can assure that the emission light 203 from the light spot on the wavelength conversion material layer 204 can enter the entrance aperture 206a of the light collection device 206 after being reflected by the reflection surface 202b of the arc-shaped reflection device. In this preferred embodiment, an advantage of this arc-shaped reflection device is that it is easy to manufacture. In another preferred embodiment, the arc-shaped reflection device is a hemi-ellipsoid or part of a hemi-ellipsoid, and the light spot on the wavelength conversion material layer 204 formed by the excitation light 201 is located at a focus point of the hemi-ellipsoid, and the entrance aperture 206a of the light collection device 206 is located at the other focus point of the hemi-ellipsoid. In this embodiment, the light collection efficiency is higher, but a disadvantage is that the manufacturing cost of the arc-shaped reflection device having a hemi-ellipsoidal or part of hemi-ellipsoid shape is higher.

In summary, the color uniformity of the emission light in the illumination device according to this embodiment can be improved effectively by mixing scattering material into the wavelength conversion material layer 204. In the meantime, the addition of scattering material doesn't reduce the illumination efficiency of the illumination device as the light guide device 202 can direct the excitation light reflected by the wavelength conversion material layer into the light exit port efficiently, and then the conflict between the color uniformity of the emission light and the luminous efficiency of the illumination device is resolved.

The illumination device according to the second embodiment of the present invention is similar to the first embodiment but further includes a driving unit for driving the wavelength conversion material layer to move relatively to the excitation light, as illustrated in FIG. 4. Specifically, in the illumination device according to this embodiment, the wavelength conversion material layer 404 has a ring shape, and the reflective substrate 405 has a round shape, both of which are shown in the plan view in FIG. 4a. The wavelength conversion material layer 404 and the driving unit 410 are fixed to the reflective substrate 405 respectively. In this embodiment, the driving unit 410 is a motor for driving the reflective substrate 405, which carries the wavelength conversion material layer 404, to rotate around the axis of the motor. The advantage of this embodiment is that, any part of the wavelength conversion material layer is excited and generates heat only when it moves to the position exposed to the excitation light 401; it then cools rapidly when moved to other positions due to air cooling. Therefore, the temperature of the wavelength conversion material layer is lower in this embodiment compared to the first embodiment.

The illumination device according to this embodiment may also include other wavelength conversion material layers 404a and 404b deposited on the round-shaped reflective substrate 405, as shown in FIG. 4b. The wavelength conversion material layers 404, 404a and 404b are exposed to the excitation light 403 successively to emit lights of different colors. In some implementations, the wavelength conversion material layer 404a and 404b may include little or no scattering materials to reduce the amount of the excitation light component in the corresponding emission light.

Figure 5:
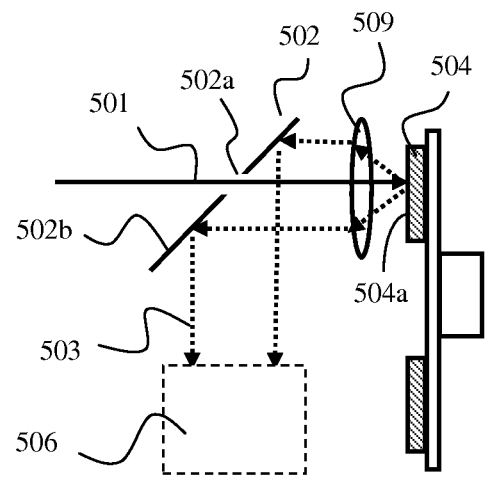
FIG. 5 illustrates an illumination device according to a third embodiment of the present invention.

The third embodiment of the present invention is illustrated in FIG. 5. Instead of the arc-shaped reflective device 302 in the second embodiments, the reflective device according to this embodiment includes a first planar reflective device 502 having a clear aperture 502a and a flat reflection surface 502b around the clear aperture. The excitation light 501 is directed by the first plane reflection device 502 by passing through the clear aperture 502a and impinges on the first surface 504a of the wavelength conversion material layer 504, while the mixed light 503 emitted from the first surface of the wavelength conversion material layer 504, which include the converted light and the remaining excitation light that hasn't been absorbed by the wavelength conversion material layer, is directed to the light exit port 506 by being reflected by the reflection surface 502*b* of the first planar reflection device 502.

Figure 1A:
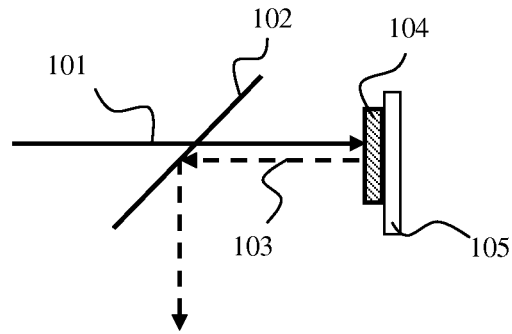
FIGS. 1a and 1b illustrate the structures of conventional illumination devices.
Figure 1B:
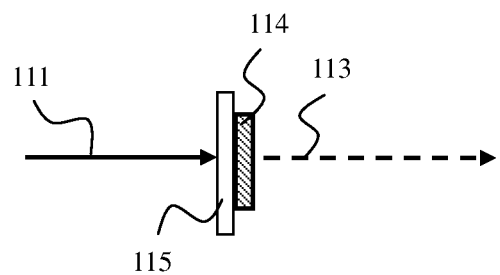

The illumination device also includes a collection lens 509 for transmitting the excitation light 501 and gathering the mixed light 503 from the wavelength conversion material 504 to form a light beam, where the diameter of the light beam of the mixed light is greater than that of the excitation light 501. Based on the difference in the diameter of the mixed light 503 and that of the excitation light 501, the first planar reflective device 502 can separate the optical path of the two lights. What is different from the configuration shown in FIG. 1*a* is that, the excitation light and the converted light are both directed to the exit port 506 at the same time because the optical paths of the two lights are not separated based on the difference of wavelength spectra of these two lights.

Figure 9:
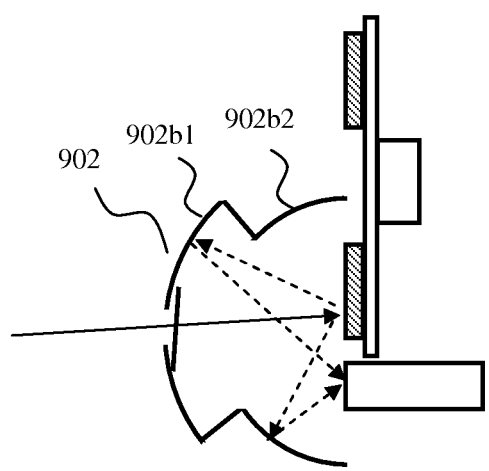
FIG. 9 illustrates an illumination device according to a fourth embodiment of the present invention.

The fourth embodiment of the present invention is illustrated in FIG. 9. The illumination device of FIG. 9 is similar to that of the second embodiment (FIG. 4), except that the reflective device 902 according to this embodiment is a saw-tooth shaped reflective device including at least two saw-tooth surfaces 902*b*1 and 902*b*2, each of which is a part of one of a group of concentric spheres. The saw-tooth surfaces 902*b*1 and 902*b*2 both function as an arc-shaped reflective device similar to the reflector of the second embodiment, so the saw-tooth shaped reflection device 902 can be regarded as a nested combination of multiple arc-shaped reflection device and has the same effect as the arc-shaped reflection device of the second embodiment for reflecting the mixed light emitted from the wavelength conversion material layer. The difference between the saw-tooth shaped reflective device and the arc-shaped reflective device is that the saw-tooth shaped reflection device is more compact.

Figure 6:
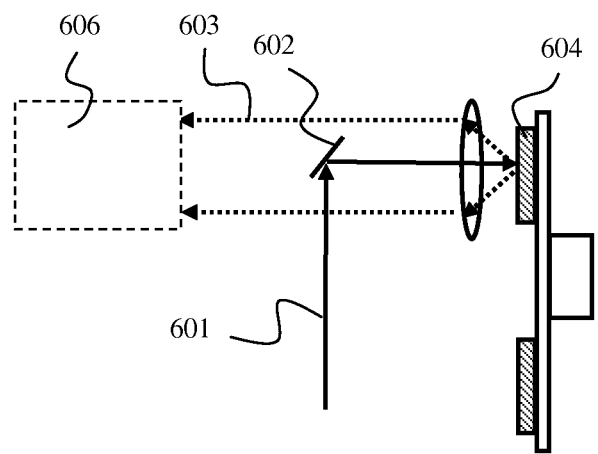
FIG. 6 illustrates an illumination device according to a fifth embodiment of the present invention.

The fifth embodiment of the present invention is illustrated in FIG. 6. Unlike the third embodiment (FIG. 5) which uses a planar reflector 502, the light guide device according to this embodiment includes a planar reflection device 602, which directs the excitation light 601 onto the first surface of the wavelength conversion material layer 604 by reflection. The mixed light 603 emitted from the first surface of the wavelength conversion material layer 604, which is composed of the converted light and the excitation light that hasn't been absorbed by the wavelength conversion material layer, propagates through the space around the planar reflective device 602 and enters the light exit port 606.

The sixth embodiment of the present invention is illustrated in FIG. 7. The illumination device of this embodiment is similar to that of the second embodiment (FIG. 4) in that the light guide device according to this embodiment includes an arc-shaped reflective device 702 having a clear aperture 702*a* and a reflection surface 702*b* placed around the clear aperture. The excitation light 701 is directed by the arc-shaped reflection device 702 by passing through the clear aperture 702*a* and impinges on the first surface of the wavelength conversion material layer 704, while the mixed light 703*a* emitted from the first surface 704*a* of the wavelength conversion material layer 704, which includes converted light and the excitation light that hasn't been absorbed by the wavelength conversion material layer, is directed by being reflected by the reflective surface 702*b* back to the first surface of the wavelength conversion material layer 704. Part of this light penetrates though the wavelength conversion material layer 704, then enters the light exit port 706 and becomes the emission light 703.

In this embodiment, the substrate 705 for holding the wavelength conversion material layer is made of optical transparent material like glass to transmit light.

In this embodiment, a part of the mixed light 703*a* is emitted from the first surface 704 of the wavelength conversion material 704, and then reflected back on the first surface 704 of the wavelength conversion material layer 704 by the reflective surface 702*b* of the arc-shaped reflection device 702. One portion of the mixed light 703*a* reflected back to the wavelength conversion material layer 704 penetrates through the wavelength conversion material layer 704 and enters the light exit port 706. The rest is reflected by the wavelength conversion material layer 704, then reflected again by the reflective surface 702*b* of the arc-shaped reflection device 702 back to the wavelength conversion material layer 704. This process is repeated, where a portion of mixed light 703*a* penetrating through the wavelength conversion material layer 704 and enters the light exit port 706 in each repetition, till all mixed lights 703*a* penetrate through the wavelength conversion material layer 704 and enter the light exit port 706.

In this embodiment, the arc-shaped reflective device 702 is a hemisphere or a part of a hemisphere, and the position where the excitation light is incident on the wavelength conversion material layer 704 is located in the centre of the hemisphere. Lights emitted from the centre of a sphere will travel back to the centre of the sphere after being reflected by the surface of the sphere.

As in the fourth embodiment (FIG. 9), the arc-shaped reflective device 702 according to the sixth embodiment of the present invention may also be replaced by a saw-tooth shaped reflective device, which has the same function as the arc-shaped reflective device.

The seventh embodiment of the present invention is illustrated in FIG. 8. The light guide device according to this embodiment includes an interference filter 802 for transmitting the excitation light 801 onto the first surface 804*a* of the wavelength conversion material layer 804. The filter 802 also acts as the substrate, similar to the substrate 405 in FIG. 4, to carry the wavelength conversion material 804. The spectral characteristic of the interference filter 802 is that it transmits the excitation light with incidence angles smaller than a first predefined angle and reflects the excitation light with incidence angles larger than a second predefined angle as well as the converted light.

The light traveling path during the working process of the illumination device according to this embodiment is shown in FIG. 8*a*. The excitation light 801 is transmitted through the interference filter 802 and incident on the wavelength conversion material layer 804. A first portion of the excitation light is absorbed by the wavelength conversion material to generate a converted light. A second portion of the excitation light 803*a*2 is reflected by the wavelength conversion material toward the interference filter 802. A third portion of the excitation light penetrates through the wavelength conversion material layer 804 directly and becomes a part of the emission light 803*a*1 and enters the light exit port 806.

Of the converted light, a first part 803*b*1 is emitted toward and enters the light exit port 806. A second part 803*b*2 is emitted toward the interference filter 802 and reflected by the filter 802 back to the wavelength conversion material layer 804; it then penetrates through the wavelength conversion material layer 804 and enters the light exit port 806.

In this embodiment, adding scattering material into the wavelength conversion material layer 804 will increase the reflected excitation light. However, these reflected excitation lights will finally enter the light exit port 806 as the interference filter 802 will reflect lights with incidence angle larger than the second predefined angle in those reflected excitations lights.

Of the excitation light reflected by the wavelength conversion material layer 804, a portion 803a3 with incidence angles smaller than the second predefined angle will pass through the interference filter 802 and becomes an energy loss, but this energy loss is only a small percentage of the entire light energy. For example, for commonly used interference filters, the first predefined angle is from 10 degrees to 25 degrees, and the corresponding second predefined angle is from 20 degrees to 40 degrees. Specifically, when the second predefined angle is 20 degrees, 88% of the excitation light reflected by the wavelength conversion material layer 804 can be reflected back by the interference filter 802 for utilization. The angles described above are only examples and don't limit the utilization of other angles.

In this embodiment, in order to reduce reflection of the excitation light 801 by the interference filter 802, preferably, the incidence angle at which the excitation light 801 is incident on the interference filter 802 is smaller than the first predefined angle. Furthermore, in order to avoid increase of the light spot size on the wavelength conversion material becoming, which is caused by lights being reflected back and forth between the interference filter 802 and the wavelength conversion material layer 804, preferably, the interference filter 802 is disposed in close proximity of the wavelength conversion material layer 804. For optimization, the coated side of the interference filter 802 should face the wavelength conversion material layer 804, and an air gap should exist between the interference filter 802 and the wavelength conversion material layer 804, which greatly improves the reflectance of the interference filter 802 for the converted light.

The present invention also provides a projecting device, which uses the illumination device described above as light source.

The present invention also provides a lighting device, which uses the illumination device described above as light source.

It will be apparent to those skilled in the art that various modification and variations can be made in the light source device and system of the present invention without departing from the spirit or scope of the invention. Thus, it is intended that the present invention cover modifications and variations that come within the scope of the appended claims and their equivalents.

What is claimed is:

1. An illumination device comprising:
   an excitation light source for generating an excitation light;
   a wavelength conversion material layer with a first surface, the wavelength conversion material layer containing a wavelength conversion material and a scattering material, the wavelength conversion material absorbing a portion of the excitation light and emitting a converted light with a wavelength spectrum different from that of the excitation light, the scattering material scattering the excitation light into a near-isotropic luminous distribution, the wavelength conversion material layer emitting from its first surface a mixed light which includes the converted light and unabsorbed excitation light scattered by the scattering material;
   a light exit port; and
   a light guide device located adjacent the wavelength conversion material layer on a side facing its first surface, for directing the excitation light onto the first surface of the wavelength conversion material layer, and directing the mixed light emitted from the first surface of the wavelength conversion material layer into the light exit port.

2. The illumination device of claim 1, wherein the scattering material includes white or optical transparent inorganic powders.

3. The illumination device of claim 1, wherein a mass ratio of the scattering material to the wavelength conversion material is larger than 0.1.

4. The illumination device of claim 3, wherein the mass ratio of the scattering material to the wavelength conversion material is larger than 1.

5. The illumination device of claim 4, wherein the mass ratio of the scattering material to the wavelength conversion material is larger than 2 and smaller than 10.

6. The illumination device of claim 1, wherein the wavelength conversion material and the scattering material are mixed homogeneously.

7. The illumination device of claim 1, wherein the wavelength conversion material layer includes a wavelength conversion material sub-layer formed of the wavelength conversion material and a scattering material sub-layer formed of the scattering material disposed over each other.

8. The illumination device of claim 7, wherein the wavelength conversion material sub-layer is located closer to the first surface of the wavelength conversion material layer than the scattering material sub-layer.

9. The illumination device of claim 7, wherein the scattering material sub-layer is located closer to the first surface of the wavelength conversion material layer than the wavelength conversion material sub-layer.

10. The illumination device of claim 1, wherein the wavelength conversion material layer comprises an adhesive material for adhering the wavelength conversion material and scattering material together.

11. The illumination device of claim 1, further comprising:
    a driving unit for driving the wavelength conversion material layer to move relatively to the excitation light.

12. The illumination device of claim 1, further comprising:
    a reflective substrate,
    wherein the wavelength conversion material layer has a second surface opposite the first surface, the second surface of the wavelength conversion material layer being in contact with the substrate, wherein the substrate reflects the converted light and the unabsorbed excitation light toward the light guide device.

13. The illumination device of claim 1, further comprising:
    a reflective substrate,
    wherein the wavelength conversion material layer includes a scattering material layer deposited on the reflective substrate, wherein the scattering material layer and the reflection substrate collectively scatter and reflect the excitation light.

14. The illumination device of claim 12, wherein the light guide device includes a reflective device having a clear aperture and a reflective surface around the clear aperture, the reflection device directing the excitation light by passing it through the clear aperture to impinge on the first surface of the wavelength conversion material layer, and directing the mixed light into the light exit port by reflecting it with the reflection surface.

15. The illumination device of claim 14, wherein the reflective surface is an arc-shaped reflective surface.

16. The illumination device of claim 15, wherein the arc-shaped reflective surface is a hemisphere or a part of a hemisphere, wherein a light spot on the wavelength conversion material layer formed by the excitation light is located at a first point close to a center of the hemisphere, and wherein the entrance aperture is located at a second point close to the center of the hemisphere, the first point and the second point being symmetric about the center.

17. The illumination device of claim 15, wherein the arc-shaped reflective surface is a hemi-ellipsoid or a part of a hemi-ellipsoid, wherein a light spot on the wavelength conversion material layer formed by the excitation light is located at a focus point of the hemi-ellipsoid, and wherein the entrance aperture is located at another focus point of the hemi-ellipsoid.

18. The illumination device of claim 14, further comprising:
   a filtering optics located at the clear aperture for transmitting the excitation light and reflecting the converted light.

19. The illumination device of claim 14, wherein the reflective surface is planar.

20. The illumination device of claim 14, further comprising:
   a light collection device located at the light exit port and having an entrance aperture;
   the reflective device including a saw-tooth shaped reflective device which directs the mixed light emitted from the first surface of the wavelength conversion material layer by reflecting it into the entrance aperture of the light collection device.

21. The illumination device of claim 12, wherein the light guide device includes a reflective device with a planar reflective surface which directs the excitation light by reflecting it to the first surface of the wavelength conversion material layer, and directing the mixed light emitted from the first surface of the wavelength conversion material layer by passing it around the planar reflective surface into the light exit port.

22. The illumination device of claim 1, wherein the light guide device includes a reflective device having a clear aperture and a reflective surface around the clear aperture, the reflective device directing the excitation light by passing it through the clear aperture to impinge on the first surface of the wavelength conversion material layer, and directing the mixed light emitted from the first surface of the wavelength conversion material layer by reflecting it back to the first surface of the wavelength conversion material layer, whereby the mixed light penetrates though the wavelength conversion material layer to enter the light exit port.

23. The illumination device of claim 22, wherein the reflective device includes an arc-shaped reflective surface which is a hemisphere or a part of a hemisphere, and wherein a position where the excitation light is incident on the wavelength conversion material layer is located at a centre of the hemisphere.

24. The illumination device of claim 22, wherein the reflective device includes a saw-tooth shaped reflective surface, wherein each saw tooth of the reflective surface is a hemisphere or a part of a hemisphere, and wherein a position where the excitation light is incident on the wavelength conversion material layer is located at a centre of all the hemispheres.

25. The illumination device of claim 1, wherein the light guide device includes an interference filter for transmitting the excitation light with incidence angles smaller than a first predefined angle and reflecting the excitation light with incidence angles larger than a second predefined angle and reflecting the converted light;
   the interference filter transmitting the excitation light onto the first surface of the wavelength conversion material layer, and reflecting the converted light emitted from the first surface of the wavelength conversion material layer back to the first surface of the wavelength conversion material layer, whereby the converted light penetrates through the wavelength conversion material layer to enter the light exit port; and
   the interference filter reflecting unabsorbed excitation light emitted from the first surface of the wavelength conversion material layer with incidence angle larger than the second predefined angle back to the first surface of the wavelength conversion material layer, whereby the unabsorbed excitation light penetrates through the wavelength conversion material layer to enter the light exit port.

26. The illumination device of claim 25, wherein the incidence angle at which the excitation light is incident on the interference filter is smaller than the first predefined angle.

27. The illumination device of claim 25, wherein the interference filter is disposed in close proximity of the wavelength conversion material layer.

28. The illumination device of claim 27, wherein the interference filter is disposed with an air gap between the interference filter and the wavelength conversion material layer.

29. A projecting device comprising a light source, which includes the illumination device of claim 1.

30. A lighting device comprising a light source, which includes the illumination device of claim 1.

* * * * *